United States Patent
Zeng et al.

(10) Patent No.: US 8,855,251 B2
(45) Date of Patent: Oct. 7, 2014

(54) POWER ADJUSTING METHOD AND APPARATUS

(71) Applicant: Huawei Technologies Co., Ltd., Shenzhen (CN)

(72) Inventors: Yunbao Zeng, Beijing (CN); Chengquan Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/862,717

(22) Filed: Apr. 15, 2013

(65) Prior Publication Data

US 2013/0301763 A1    Nov. 14, 2013

(30) Foreign Application Priority Data

Apr. 12, 2012    (CN) .......................... 2012 1 0106367

(51) Int. Cl.
  *H04L 27/08*        (2006.01)
  *H04L 27/38*        (2006.01)

(52) U.S. Cl.
  CPC .............. *H04L 27/3809* (2013.01); *Y02B 60/50* (2013.01)
  USPC ....................... 375/345; 455/232.1; 455/234.1

(58) Field of Classification Search
  CPC ... H03G 3/3052; H03G 3/3068; H03G 3/001; H03G 3/3078; H03G 3/3047; H03G 3/3089; H04L 27/3809; H04B 17/0057
  USPC .......... 375/260, 345, 146, 261; 370/208, 294, 370/491, 329; 455/232.1, 234.1, 230, 250.1
  See application file for complete search history.

(56) References Cited

U.S. PATENT DOCUMENTS

| 4,170,023 | A | 10/1979 | Yamakoshi et al. |
| 5,452,332 | A | 9/1995 | Otani et al. |
| 6,873,833 | B2* | 3/2005 | Yang et al. ................. 455/232.1 |
| 7,970,066 | B1* | 6/2011 | Lee et al. ...................... 375/260 |

(Continued)

FOREIGN PATENT DOCUMENTS

CN            102273164 A       12/2011

OTHER PUBLICATIONS

Il-Gu Lee; Jungbo Son; Eunyoung Choi; Sok-Kyu Lee, "Fast automatic gain control employing two compensation loop for high throughput MIMO-OFDM receivers," Circuits and Systems, 2006. ISCAS 2006. Proceedings. 2006 IEEE International Symposium on, vol., No., pp. 4 pp.,, May 21-24, 2006.*

*Primary Examiner* — Daniel Washburn
*Assistant Examiner* — Amneet Singh
(74) *Attorney, Agent, or Firm* — Leydig, Voit & Mayer, Ltd.

(57) ABSTRACT

A power adjusting method and apparatus provided by embodiments of the present invention relate to the field of communications. The power adjusting method of this embodiment includes: receiving a signal from a sending end, where the signal includes a cyclic prefix (CP) signal; detecting and acquiring first receiving power and second receiving power of the CP signal, where the first receiving power is average power of N sampling points of the CP signal, and the second receiving power is average power of M sampling points of the CP signal; after determining that a ratio of the first receiving power to target power is greater than a first preset threshold, adjusting signal power magnification; and after determining that the ratio of the second receiving power to the target power is greater than a second preset threshold, adjusting the signal power magnification again.

11 Claims, 3 Drawing Sheets

(56) References Cited

U.S. PATENT DOCUMENTS

| | | | |
|---|---|---|---|
| 8,254,503 B1* | 8/2012 | Lee et al. | 375/345 |
| 2004/0202102 A1* | 10/2004 | Kim et al. | 370/208 |
| 2005/0063298 A1* | 3/2005 | Ling et al. | 370/208 |
| 2008/0002792 A1* | 1/2008 | Shalev | 375/345 |
| 2008/0130799 A1* | 6/2008 | Yousef et al. | 375/345 |
| 2008/0273636 A1* | 11/2008 | Zhu et al. | 375/345 |
| 2009/0268678 A1* | 10/2009 | Huo et al. | 370/329 |
| 2009/0310690 A1* | 12/2009 | Lee | 375/260 |
| 2010/0189188 A1* | 7/2010 | Li et al. | 375/260 |
| 2011/0311006 A1* | 12/2011 | Wang | 375/345 |

* cited by examiner

POWER ADJUSTING METHOD AND APPARATUS

CROSS-REFERENCE TO RELATED APPLICATION

This application claims priority to Chinese Patent Application No. 201210106367.2, filed on Apr. 12, 2012, which is hereby incorporated by reference in its entirety.

FIELD OF THE INVENTION

The present invention relates to the field of communications, and in particular, to a power adjusting method and apparatus.

BACKGROUND OF THE INVENTION

In a burst frame system, after receiving a signal, a receiving end performs automatic gain control on the signal, and the gain refers to signal power magnification. The burst frame system can provide a cyclic prefix mechanism or similar mechanisms, that is, the signal received by the receiving end includes a cyclic prefix signal, where the cyclic prefix signal can enable the receiving end to learn that a data signal is coming.

The receiving end receives frames at unfixed intervals and a power fluctuation range of the received signal is large and changes frequently, so that requirements on the automatic gain control for the receiving end are high. The receiving end is required to realize signal power magnification when the signal is coming to enable the signal power to be close to target power and subsequent modules are supported in working normally. However, in the prior art, because of limitation of A/D (Analog to Digital Converter, where an analog signal is converted to a digital signal) bit bandwidth, the receiving end is incapable of realizing signal power magnification accurately.

SUMMARY OF THE INVENTION

Embodiments of the present invention provide a power adjusting method and apparatus, where after power of a cyclic prefix signal is detected and acquired, the power of the cyclic prefix signal is determined, thereby adjusting signal power magnification to improve accuracy of signal power magnifying.

To achieve the above objective, the embodiments of the present invention adopt the following technical solutions:

In one aspect, a power adjusting method provided by the embodiment of the present invention includes:

receiving a signal from a sending end, where the signal includes a cyclic prefix (CP) signal;

detecting and acquiring first receiving power and second receiving power of the CP signal, where the first receiving power is average power of N sampling points of the CP signal and the second receiving power is average power of M sampling points of the CP signal;

after it is determined that a ratio of the first receiving power to target power is greater than a first preset threshold, adjusting signal power magnification, so that the ratio of the adjusted receiving power to the target power is smaller than the first preset threshold; and after it is determined that a ratio of the second receiving power to the target power is greater than a second preset threshold, adjusting the signal power magnification again, so that the ratio of the adjusted receiving power to the target power is smaller than the second preset threshold.

In one aspect, a receiving end provided by the embodiment of the present invention includes:

a receiving module, configured to receive a signal from a sending end, where the signal includes a cyclic prefix (CP) signal;

a power acquiring module, configured to detect and acquire first receiving power and second receiving power of the CP signal, where the first receiving power is average power of N sampling points of the CP signal and the second receiving power is average power of M sampling points of the CP signal;

a determining module, configured to determine a ratio of the first receiving power to target power and a ratio of the second receiving power to the target power; and a power adjusting module, configured to: after it is determined that the ratio of the first receiving power to the target power is greater than a first preset threshold, adjust signal power magnification, so that the ratio of the adjusted receiving power to the target power is smaller than the first preset threshold; and after it is determined that the ratio of the second receiving power to the target power is greater than a second preset threshold, adjust the signal power magnification again, so that the ratio of the adjusted receiving power to the target power is smaller than the second preset threshold.

In the power adjusting method and apparatus provided by the embodiments of the present invention, after the signal including the CP (Cyclic Prefix, cyclic prefix) signal is received from the sending end, the first receiving power and the second receiving power of the CP signal is detected and acquired; after it is determined that the ratio of the first receiving power to the target power is greater than the first preset threshold, the signal power magnification is adjusted, so that the ratio of the adjusted receiving power to the target power is smaller than the first preset threshold; and after it is determined that the ratio of the second receiving power to the target power is greater than the second preset threshold, the signal power magnification is adjusted again, so that the ratio of the adjusted receiving power to the target power is smaller than the second preset threshold. By using this solution, it is possible to determine the power of the cyclic prefix signal after the power of the cyclic prefix signal is detected and acquired, thereby adjusting the signal power magnification to improve the accuracy of signal power magnifying.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

In the following description, to illustrate rather than limit, specific details such as a particular system structure, an interface, and a technology are provided to make a better understanding of the present invention. However, it should be understood by persons skilled in the art that the present invention can also be implemented in other embodiments without the specific details. In other situations, detail descriptions of a well known apparatus, circuit and method are not provided, so that the present invention is described without being disturbed by the unnecessary details.

The terms "system" and "network" in this document may always be exchanged for use in this document. The term "and/or" in this document is only an association relationship for describing the associated objects, and represents that three relationships may exist, for example, A and/or B may represent the following three cases: A exists separately, both A and B exist, and B exists separately. In addition, the character "/" in this document usually represents that the former and later associated objects are in a "or" relationship.

Figure 1:
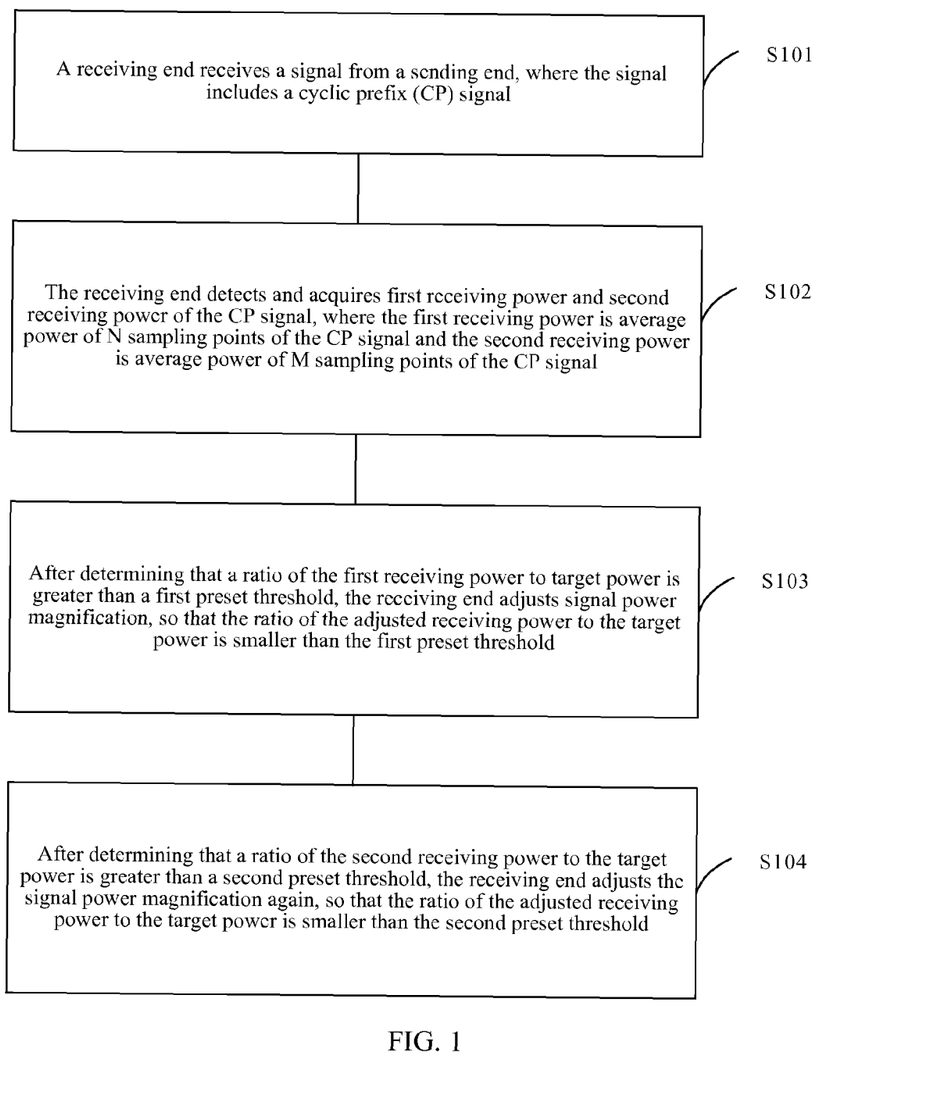
FIG. 1 is a first schematic flow chart of a power adjusting method of an embodiment of the present invention.

A power adjusting method provided by the embodiment of the present invention, as shown in FIG. 1, includes the followings:

S101: A receiving end receives a signal from a sending end, where the signal includes a cyclic prefix (CP) signal.

A burst frame system can provide a cyclic prefix mechanism, that is, the signal received by the receiving end from the sending end includes the CP signal, and the CP signal can enable the receiving end to learn that a data signal is coming. In the embodiment of the present invention, the receiving end receives the signal from the sending end, where the signal may include the CP signal and the signal received by the receiving end is an analog signal, so that the receiving end may perform digital/analog conversion on the signal after receiving the signal from the sending end, and the digital/analog conversion can also be called A/D quantization, which enables the analog digital signal to be converted into a digital signal.

S102: The receiving end detects and acquires first receiving power and second receiving power of the CP signal, where the first receiving power is average power of N sampling points of the CP signal and the second receiving power is average power of M sampling points of the CP signal.

After receiving the signal from the sending end, the receiving end detects the CP signal included in the signal to acquire the first receiving power and the second receiving power of the CP signal.

Specifically, the CP signal is the CP signal that has undergone the digital/analog conversion, so that the receiving end can detect the signal power of the N sampling points in the CP signal to acquire the average power of the N sampling points.

Exemplarily, by acquiring a summation of the respective squared signal power of the N sampling points and dividing the summation by N, the receiving end can acquire the average power of the N sampling points, that is, the first receiving power. The N sampling points in the CP signal that is detected by the receiving end may be the last N sampling points in the CP signal, that is, the N sampling points in the received CP signal that are nearest a detection time counting from the detection time.

Similarly, by acquiring a summation of the respective squared signal power of the M sampling points and dividing the summation by M, the receiving end can acquire the average power of the M sampling points, that is, the second receiving power. The M sampling points in the CP signal that is detected by the receiving end may be the last M sampling points in the CP signal, that is, the M sampling points in the received CP signal that are nearest the detection time counting from the detection time. N is smaller than or equal to M, and values of M and N can be determined according to the length and/or number of CP signals.

It should be pointed out that, a calculation method for acquiring the first receiving power and the second receiving power of the CP signal provided by the embodiment of the present invention is merely exemplary, and the first receiving power and the second receiving power can also be acquired by using other methods, and those methods are all used for acquiring the average power of the CP sampling points, and therefore they should also fall within the protection scope of the present invention. Moreover, the solution that the receiving end detects the sampling points in the CP signal, which is provided by the embodiment of the present invention, is merely a preferred solution for acquiring more accurate receiving power, certainly, other sampling points in the CP signal can also be detected, for the final objective of acquiring the receiving power of the CP signal, thereby also falling within the protection scope of the present invention.

It should be added that, the CP signal is a serial signal, so that in order to acquire the more accurate receiving power, the receiving end may also detect and acquire third receiving power of the CP signal.

Specifically, the CP signal is the CP signal that has undergone the digital/analog conversion, so that the receiving end can detect the signal power of L sampling points in the CP signal to acquire the average power of the L sampling points.

Exemplarily, by acquiring a summation of the respective squared signal power of the L sampling points and dividing the summation by L, the receiving end can acquire the average power of the L sampling points, that is, the third receiving power. The L sampling points in the CP signal that is detected by the receiving end may be the last 2M sampling points to the last M sampling points in the CP signal, that is, the 2M sampling points to the M sampling points in the received CP signal that are nearest the detection time counting from the detection time.

S103: After determining that a ratio of the first receiving power to target power is greater than a first preset threshold, the receiving end adjusts signal power magnification, so that the ratio of the adjusted receiving power to the target power is smaller than the first preset threshold.

After acquiring the first receiving power, the receiving end determines the ratio of the first receiving power to the target power; after determining that the ratio of the first receiving power to the target power is greater than the first preset threshold, the receiving end adjusts the signal power magnification, so that the ratio of the adjusted receiving power to the target power is smaller than the first preset threshold, that is, the adjusted receiving power is closer to the target power.

S104: After determining that a ratio of the second receiving power to the target power is greater than a second preset threshold, the receiving end adjusts the signal power magnification again, so that the ratio of the adjusted receiving power to the target power is smaller than the second preset threshold.

After acquiring the second receiving power, the receiving end determines the ratio of the second receiving power to the target power; after determining that the ratio of the second receiving power to the target power is greater than the second preset threshold, the receiving end adjusts the signal power magnification again, so that the ratio of the adjusted receiving power to the target power is smaller than the second preset threshold, that is, the adjusted receiving power is closer to the target power. Therefore, the first preset threshold may be greater than the second preset threshold.

It should be noted that, in step S103, the adjustment after the receiving end determines the ratio of the first receiving power to the target power may be large step adjustment, that is, the receiving power of the adjusted receiving power can be made to be closer to the target power. However, in step S104, the adjustment after the receiving end determines the ratio of the second receiving power to the target power may be small step adjustment, that is, the receiving power of the adjusted receiving power can be made to be closer to the target power. Similarly, if it would like to enable the receiving power to be much closer to the target power, the adjustment can be further performed when it is determined that the ratio of the third receiving power to the target power is greater than the second threshold, so that the ratio of the adjusted receiving power to the target power is smaller than the second preset threshold.

In the power adjusting method provided by the embodiment of the present invention, after receiving the signal including the CP signal from the sending end, the receiving end detects and acquires the first receiving power and the second receiving power of the CP signal; after determining that the ratio of the first receiving power to the target power is greater than the first preset threshold, the receiving end adjusts the signal power magnification, so that the ratio of the adjusted receiving power to the target power is smaller than the first preset threshold; and after determining that the ratio of the second receiving power to the target power is greater than the second preset threshold, the receiving end adjusts the signal power magnification again, so that the ratio of the adjusted receiving power to the target power is smaller than the second preset threshold. By using this solution, it is possible to determine the power of the cyclic prefix signal after the power of the cyclic prefix signal is detected and acquired, thereby adjusting the signal power magnification to improve the accuracy of signal power magnifying.

Figure 2:
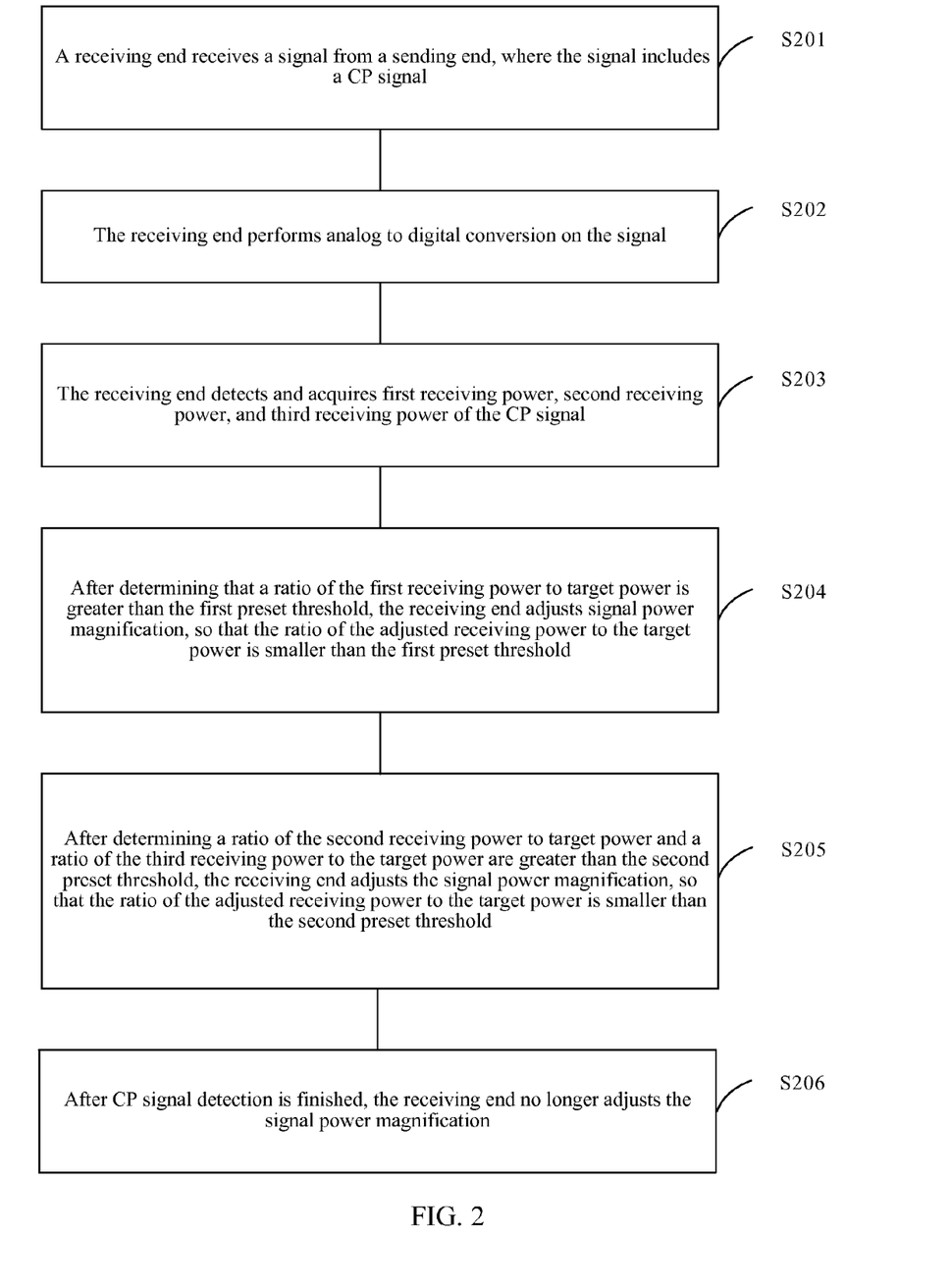
FIG. 2 is a second schematic flow chart of a power adjusting method of an embodiment of the present invention.

A power adjusting method provided by the embodiment of the present invention, as shown in FIG. 2, includes the followings.

S201: A receiving end receives a signal from a sending end, where the signal includes a CP signal.

The single received by the receiving end from the sending end includes the CP signal, and the CP signal can enable the receiving end to learn that a data signal is coming. In the embodiment of the present invention, the receiving end receives the signal from the sending end, and the signal may include the CP signal.

S202: The receiving end performs analog to digital conversion on the signal.

After receiving the signal from the sending end, the receiving end can perform the digital/analog conversion, which can also be called A/D quantization, on the signal to convert an analog signal into a digital signal.

S203: The receiving end detects and acquires first receiving power, second receiving power, and third receiving power of the CP signal.

After receiving the signal from the sending end, the receiving end detects the CP signal included in the signal to acquire the first receiving power, the second receiving power, and the third receiving power of the CP signal.

The first receiving power is average power of the last N sampling points of the CP signal that has undergone the analog to digital conversion, the second receiving power is the average power of the last M sampling points of the CP signal that has undergone the analog to digital conversion, the third receiving power is the average power of the last 2M sampling points to the last M sampling points of the CP signal that has undergone the analog to digital conversion; N is smaller than or equal to M, values of M and N can be determined according to the length and/or number of CP signals and adjustment time of an automatic gain control required by a system.

Specifically, the CP signal is the CP signal that has undergone the digital/analog conversion, so that the receiving end can detect the signal power of the N sampling points in the CP signal to acquire the average power of the N sampling points.

Exemplarily, by acquiring a summation of the respective squared signal power of the N sampling points and dividing the summation by N, the receiving end can acquire the average power of the N sampling points, that is, the first receiving power. The N sampling points in the CP signal that is detected by the receiving end may be the last N sampling points in the CP signal, that is, the N sampling points in the received CP signal that are nearest a detection time counting from the detection time.

Similarly, by acquiring a summation of the respective squared signal power of the M sampling points and dividing the summation by M, the receiving end can acquire the average power of the M sampling points, that is, the second receiving power. The M sampling in the CP signal that is detected by the receiving end may be the last M sampling points in the CP signal, that is, the M sampling points in the received CP signal that are nearest the detection time counting from the detection time.

By acquiring a summation of the respective squared signal power of the M sampling points from the last 2M sampling point to the last M sampling points in the CP signal and dividing the summation by M, the receiving end can acquire the average power of the M sampling points, that is, the third receiving power.

The embodiment of the present invention sets two thresholds: a first preset threshold and a second preset threshold, where the first receiving threshold is greater than the second preset threshold. The first preset threshold is a difference between the receiving power within the threshold and rear power of the signal (eliminate the effect of the A/D quantization and saturation limiting properties on power statistics) within a range allowed by the system; the second preset threshold is defined so as to make a loss be within the range allowed by the system caused by an A/D quantization error when the signal is within the second preset threshold.

It should be pointed out that, a calculation method for acquiring the first receiving power, the second receiving power, and the third receiving power of the CP signal provided by the embodiment of the present invention is merely exemplary, and the first receiving power, the second receiving power, and the third receiving power can also be acquired by using other methods, which should also fall within the protection scope of the present invention. Moreover, the solution that the receiving end detects the sampling point in the CP signal, which is provided by the embodiment of the present invention, is merely a preferred solution for acquiring more accurate receiving power, certainly, other sampling points in the CP signal can also be detected, for the final objective of acquiring the receiving power of the CP signal, thereby also falling within the protection scope of the present invention.

S204: After determining that a ratio of the first receiving power to target power is greater than the first preset threshold, the receiving end adjusts signal power magnification, so that the ratio of the adjusted receiving power to the target power is smaller than the first preset threshold.

After acquiring the first receiving power, the receiving end determines the ratio of the first receiving power to the target power; after determining that the ratio of the first receiving power to the target power is greater than the first preset threshold, the receiving end adjusts the signal power magnification, so that the ratio of the adjusted receiving power to the target power is smaller than the first preset threshold, that is, the adjusted receiving power is closer to the target power.

S205: After determining that a ratio of the second receiving power to target power and a ratio of the third receiving power to the target power are greater than the second preset threshold, the receiving end adjusts the signal power magnification, so that the ratio of the adjusted receiving power to the target power is smaller than the second preset threshold.

After acquiring the second receiving power and the third receiving power, the receiving end determines the ratio of the second receiving power to the target power and the ratio of the third receiving power to the target power; after determining that the ratio of the second receiving power to the target power and the ratio of the third receiving power to the target power are greater than the second preset threshold, the receiving end adjusts the signal power magnification, so that the ratio of the adjusted receiving power to the target power is smaller than the second preset threshold, that is, the adjusted receiving power is closer to the target power. Therefore, the first preset threshold may be greater than the second preset threshold.

It should be noted that, in step S204, the adjustment after the receiving end determines the ratio of the first receiving power to the target power may be large step adjustment, that is, the receiving power of the adjusted receiving power can be made to be closer to the target power. However, in step S205, the adjustment after the receiving end determines the ratio of the second receiving power to the target power may be small step adjustment, and the adjustment after the receiving ends determines the ratio of the third receiving power to the target power may also be the small step adjustment, that is, the receiving power of the adjusted receiving power is made to be closer to the target power.

S206: After CP signal detection is finished, the receiving end no longer adjusts the signal power magnification.

In consideration of fluctuation of the signal, the receiving end performs real-time detection on the signal. However, after the detection for the CP signal is finished, the receiving end no longer adjusts the signal power magnification and an automatic gain control function is locked until the current signal finishes.

It should be added that, because the embodiment of the present invention can be based on a burst frame system, the power adjusting method provided by the embodiment of the present invention can be applied to a multi-user scenario of the burst frame system, and the specific adjusting method is the same as the foregoing steps and therefore is not repeated herein.

In the power adjusting method provided by the embodiment of the present invention, after receiving the signal including the CP signal from the sending end, the receiving end detects and acquires the first receiving power, the second receiving power, and the third receiving power of the CP signal; after determining that the ratio of the first receiving power to the target power is greater than the first preset threshold, the receiving end adjusts the signal power magnification, so that the ratio of the adjusted receiving power to the target power is smaller than the first preset threshold; and after determining that the ratio of the second receiving power to the target power or the ratio of the third receiving power to the target power is greater than the second preset threshold, the receiving end adjusts the signal power magnification, so that the ratio of the adjusted receiving power to the target power is smaller than the second preset threshold. By using this solution, it is possible to determine the power of the cyclic prefix signal after the power of the cyclic prefix signal is detected and acquired, thereby adjusting the signal power magnification to improve the accuracy of signal power magnifying.

Figure 3:
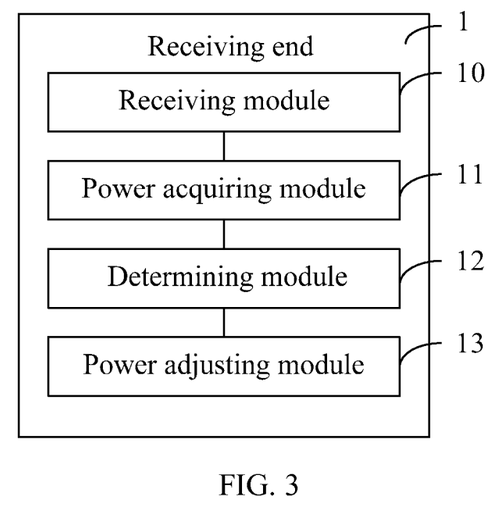
FIG. 3 is a first schematic structural diagram of a receiving end of an embodiment of the present invention.

A receiving end 1 provided by the embodiment of the present invention, as shown in FIG. 3, includes:

a receiving module 10, configured to receive a signal from a sending end, where the signal includes a cyclic prefix (CP) signal;

a power acquiring module 11, configured to detect and acquire first receiving power and second receiving power of the CP signal, where the first receiving power is average power of N sampling points of the CP signal and the second receiving power is average power of M sampling points of the CP signal;

a determining module 12, configured to determine a ratio of the first receiving power to target power and a ratio of the second receiving power to the target power; and a power adjusting module 13, configured to: after determining that the ratio of the first receiving power to the target power is greater than a first preset threshold, adjust signal power magnification, so that the ratio of the adjusted receiving power to the target power is smaller than the first preset threshold; and after determining that the ratio of the second receiving power to the target power is greater than a second preset threshold, adjust the signal power magnification again, so that the ratio of the adjusted receiving power to the target power is smaller than the second preset threshold.

Furthermore, the power acquiring module 11 is further configured to detect and acquire third receiving power of the CP signal, where the third receiving power is average power of L sampling points of the CP signal.

The determining module 12 is further configured to determine a ratio of the third receiving power to the target power.

The power adjusting module 13 is further configured to: after it is determined that the ratio of the second receiving power to target power and the ratio of the third receiving power to the target power are greater than the second preset threshold, adjust the signal power magnification, so that the ratio of the adjusted receiving power to the target power is smaller than the second preset threshold.

Furthermore, the first receiving power is the average power of the last N sampling points of the CP signal, the second receiving power is the average power of the last M sampling points of the CP signal, the third receiving power is the average power of the last 2M sampling points to the last M sampling points, and N is smaller than or equal to M.

Figure 4:
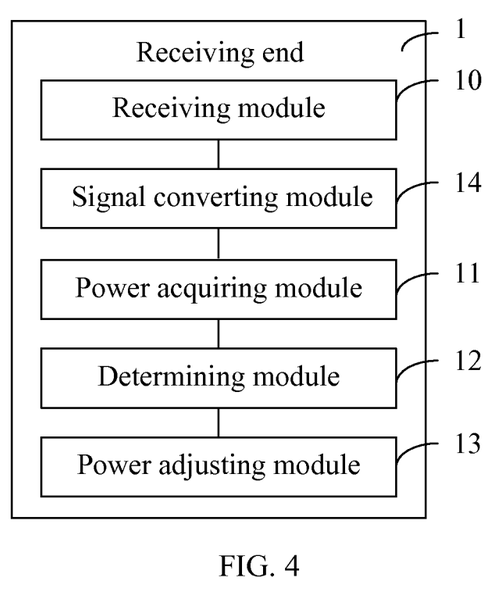
FIG. 4 is a second schematic structural diagram of the receiving end of an embodiment of the present invention.

Furthermore, as shown in FIG. 4, the receiving end 1 further includes:

a signal converting module 14, configured to perform analog to digital conversion on the signal.

Furthermore, the power adjusting module 13 is further configured to: after CP signal detection is finished, no longer adjust the signal power magnification.

In the receiving end provided by the embodiment of the present invention, after receiving the signal including the CP signal from the sending end, the receiving end detects and acquires the first receiving power and the second receiving power of the CP signal; after determining that the ratio of the first receiving power to the target power is greater than the first preset threshold, the receiving end adjusts the signal power magnification, so that the ratio of the adjusted receiving power to the target power is smaller than the first preset threshold; and after determining that the ratio of the second receiving power to the target power is greater than the second preset threshold, the receiving end adjusts the signal power magnification again, so that the ratio of the adjusted receiving power to the target power is smaller than the second preset threshold. By using this solution, it is possible to determine the power of the cyclic prefix signal after the power of the cyclic prefix signal is detected and acquired, thereby adjusting the signal power magnification to improve the accuracy of signal power magnifying.

It can be clearly understood by persons skilled in the art that, for the purpose of convenient and brief description, division of the foregoing function modules is taken as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be personal computer, a server, or a network device) or a processor (processor) to perform all or a part of steps of the methods described in the embodiments of the present invention. The storage medium includes: any medium that can store program code, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A power adjusting method, comprising:
   receiving a signal from a sending end, wherein the signal comprises a cyclic prefix (CP) signal;
   detecting and acquiring first receiving power and a second receiving power of the CP signal, wherein the first receiving power is an average power of a number N sampling points of the CP signal and the second receiving power is an average power of a number M sampling points of the CP signal;
   after determining that a first ratio of the first receiving power to a target power is greater than a first preset threshold, adjusting signal power magnification, so that an adjusted first ratio of the first receiving power to the target power is smaller than the first preset threshold; and
   after determining that a second ratio of the second receiving power to the target power is greater than a second preset threshold, adjusting the signal power magnification again, so that an adjusted second ratio of the second receiving power to the target power is smaller than the second preset threshold;
   detecting and acquiring a third receiving power of the CP signal wherein the third receiving power is an average power of a number L sampling points of the CP signal; and
   after determining that the second ratio of the second receiving power to the target power and a third ratio of the third receiving power to the target power are greater than the second preset threshold, adjusting the signal power magnification, so that an adjusted third ratio of the adjusted third receiving power to the target power is smaller than the second preset threshold.

2. The power adjusting method according to claim 1, wherein the first preset threshold is greater than the second preset threshold.

3. The power adjusting method according to claim 1, wherein the number L equals two times the number M, and the number N is smaller than or equal to the number M.

4. The power adjusting method according to claim 1, wherein after the receiving the signal in analog form from the sending end, and before the detecting and acquiring the first receiving power and the second receiving power of the CP signal, the method further comprises:
   analog to digital converting the analog form of the signal.

5. The power adjusting method according to claim 4, wherein the first receiving power is rendered from a last number N sampling points of the CP signal provided by the analog to digital converting, and the second receiving power is rendered from a last number M sampling points of the CP signal provided by the analog to digital converting.

6. The power adjusting method according to claim 1, further comprising:
   after completing the CP signal detection stopping adjusting the signal power magnification.

7. A receiving end, comprising:
   a receiving module, configured to receive a signal from a sending end, wherein the signal comprises a cyclic prefix (CP) signal;
   a power acquiring module, configured to detect and acquire a first receiving power and a second receiving power of the CP signal, wherein the first receiving power is an average power of a number N sampling points of the CP signal and the second receiving power is an average power of a number M sampling points of the CP signal;

a determining module, configured to determine a first ratio of the first receiving power to a target power and a second ratio of the second receiving power to the target power; and a power adjusting module, configured to: after it is determined that the ratio of the first receiving power to the target power is greater than a first preset threshold, adjust a signal power magnification, so that an adjusted first ratio of the first receiving power to the target power is smaller than the first preset threshold; and after it is determined that the second ratio of the second receiving power to the target power is greater than a second preset threshold, adjust the signal power magnification, so that an adjusted second ratio of the second receiving power to the target power is smaller than the second preset threshold; and wherein the power acquiring module is further configured to detect and acquire third receiving power of the CP signal wherein the third receiving power is average power of a number L sampling points of the CP signal;

the determining module is further configured to determine a third ratio of the third receiving power to the target power; and the power adjusting module is further configured to: after it is determined that the second ratio of the second receiving power to the target power and the third ratio of the third receiving power to the target power are greater than the second preset threshold, adjust the signal power magnification, so that an adjusted third ratio of the adjusted third receiving power to the target power is smaller than the second preset threshold.

8. The receiving end according to claim 7, wherein the first preset threshold is greater than the second preset threshold.

9. The receiving end according to claim 7, wherein the number L equals two times the number M, and the number N is smaller than or equal to the number M.

10. The receiving end according to claim 7, further comprising:
a signal converting module, configured to perform analog to digital conversion on the signal.

11. The receiving end according to claim 7, wherein the power adjusting module is further configured to: after completing the CP signal detection stopping adjusting the signal power magnification.

* * * * *